United States Patent
Rogginger et al.

(10) Patent No.: US 10,141,798 B2
(45) Date of Patent: Nov. 27, 2018

(54) COOLING OF AN ELECTRIC MACHINE

(71) Applicant: Siemens Aktiengesellschaft, München (DE)

(72) Inventors: Christoph Rogginger, Wittibreut (DE); Günther Winkler, Haibach (AT)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/565,089

(22) PCT Filed: Mar. 4, 2016

(86) PCT No.: PCT/EP2016/054631
§ 371 (c)(1),
(2) Date: Oct. 6, 2017

(87) PCT Pub. No.: WO2016/162150
PCT Pub. Date: Oct. 13, 2016

(65) Prior Publication Data
US 2018/0123409 A1  May 3, 2018

(30) Foreign Application Priority Data

Apr. 9, 2015  (EP) .................................. 15163032

(51) Int. Cl.
*H02K 9/19* (2006.01)
*H02K 1/20* (2006.01)
*B02C 23/00* (2006.01)

(52) U.S. Cl.
CPC .............. *H02K 1/20* (2013.01); *B02C 23/00* (2013.01); *H02K 9/19* (2013.01)

(58) Field of Classification Search
CPC ............. B02C 23/00; H02K 9/19; H02K 1/20
(Continued)

(56) References Cited

U.S. PATENT DOCUMENTS 4,544,855 A  10/1985 Prenner et al.
6,097,116 A  8/2000 Hess et al.
(Continued)

FOREIGN PATENT DOCUMENTS

CN  1784818 A  6/2006
CN  1960126 A  5/2007
(Continued)

OTHER PUBLICATIONS

PCT International Search Report and Written Opinion of International Searching Authority dated Aug. 6, 2016 corresponding to PCT International Application No. PCT/EP2016/054631 filed Apr. 3, 2016.

*Primary Examiner* — Naishadh Desai
(74) *Attorney, Agent, or Firm* — Henry M. Feiereisen LLC

(57) ABSTRACT

An electrical machine includes housing surrounding a stator laminated core and a stator winding. Stator core support rings are arranged between the housing and the stator laminated core and radially surround the stator laminated core, with a cavity being formed between the housing, the stator laminated core and the stator core support rings. The stator laminated core has a cooling channel which is fluidically coupled with the cavity via a channel entry arranged centrally in the middle of the stator laminated core, thereby creating in conjunction with the channel entry a T-shaped form of the cooling channel so that a stream of coolant is not heated over an entire length of the stator laminated core, but only over a shorter stretch as a result of the T-shaped form.

15 Claims, 3 Drawing Sheets

(58) Field of Classification Search
USPC .............................................. 310/52–64, 89
See application file for complete search history.

(56) References Cited

U.S. PATENT DOCUMENTS

| | | | | |
|---|---|---|---|---|
| 6,300,693 | B1* | 10/2001 | Poag | H02K 5/20 310/54 |
| 8,492,952 | B2* | 7/2013 | Bradfield | H02K 1/20 310/216.011 |
| 8,508,085 | B2* | 8/2013 | Bradfield | H02K 1/20 310/52 |
| 9,099,900 | B2* | 8/2015 | Glubrecht | H02K 1/20 |
| 2007/0024129 | A1 | 2/2007 | Pfannschmidt et al. | |
| 2008/0284263 | A1 | 11/2008 | Dessirier | |
| 2010/0026110 | A1 | 2/2010 | Harb et al. | |

FOREIGN PATENT DOCUMENTS

| | | |
|---|---|---|
| DE | 100 19 914 A1 | 2/2001 |
| DE | 10 2009 053 980 A1 | 5/2011 |
| EP | 0 118 802 A1 | 9/1984 |
| EP | 0 899 856 A2 | 3/1999 |
| JP | 2007236045 A | 9/2007 |
| WO | WO 2007-147187 A1 | 12/2007 |
| WO | WO 2012-003208 A2 | 1/2012 |

\* cited by examiner

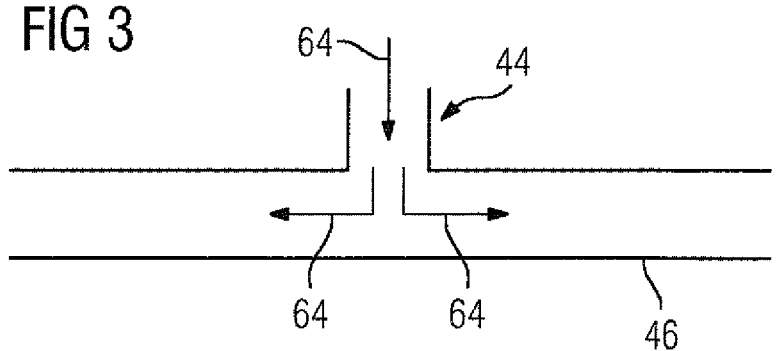

COOLING OF AN ELECTRIC MACHINE

CROSS-REFERENCES TO RELATED APPLICATIONS

This application is the U.S. National Stage of International Application No. PCT/EP2016/054631, filed Mar. 4, 2016, which designated the United States and has been published as International Publication No. WO 2016/162150 A1 and which claims the priority of European Patent Application, Serial No. 15163032.4, filed Apr. 9, 2015, pursuant to 35 U.S.C. 119(a)-(d).

BACKGROUND OF THE INVENTION

The invention relates to an electrical machine with a stator laminated core with a stator laminated core surface. The stator laminated core has a stator winding with a winding overhang, which projects into a winding head space on one face of the stator laminated core. The electrical machine additionally has a housing, which surrounds the stator laminated core and the winding overhang. The invention also includes a method for cooling an electrical machine.

During the conversion of electrical energy to mechanical energy in electric motors, losses occur in the form of heat. This waste heat must be dissipated, in order to prevent overheating of or damage to the machine. In addition, the drawing away of the heat can result in improved efficiency.

In the case of stator laminated cores of structurally large electrical machines, the ratio of electrically and electromagnetically active material, that is to say the material which generates waste heat, to the stator laminated core surface is very high. For this reason, it is difficult to conduct away or dissipate waste heat effectively from the surface of the stator laminated cores.

DE 10 2009 053 980 A1 describes an electrical machine with a stator and a stator carrier. The stator carrier comprises at least a first and a second stator carrier part, wherein the first and the second stator carrier part are arranged on the stator. The two stator carrier parts are arranged at an axial distance from each other. Embodied between the stator and the stator carrier parts is a channel, which wraps around the stator in a circumferential direction. The channel is here used for conveying a coolant. The coolant is radially fed to the channel from outside and also radially conducted away to the outside again.

DE 100 19 914 A1 discloses a cooled electrical machine for automobiles. The electrical machine comprises a housing and a stator, which is coupled with the housing via at least one vibration damper. The housing encloses the stator in such a way that by means of the housing a jacket is formed, which is used for the circulation of a coolant.

SUMMARY OF THE INVENTION

The object of the invention is to improve the heat dissipation of an electrical machine.

According to the invention this object is achieved by the subject matter of the independent claims. Advantageous developments of the invention arise from the features of the dependent claims.

According to the invention this object is achieved by an electrical machine with a stator laminated core with a stator laminated core surface, wherein the stator laminated core has a stator winding with a winding overhang, a so-called winding head. Stator laminated core surface here refers to the lateral surface of the for example cylindrical stator laminated core. The winding overhang here projects into a winding head space on one face of the stator laminated core. The electrical machine additionally comprises a housing, which surrounds the stator laminated core and the winding overhang. A first and a second stator core support ring are arranged on the stator laminated core surface between the housing and the stator laminated core or the stator laminated core surface. The first and the second stator core support ring are arranged axially at a prescribed distance from each other and radially surround the stator laminated core. As the stator core support rings are arranged between the stator laminated core and the housing, these can also be designated as a stator assembly seating.

Through the corresponding arrangement of the housing, the stator laminated core surface, the first stator core support ring and the second stator core support ring, a cavity is formed between the housing, the stator laminated core surface and the first and the second stator core support ring. This cavity is separated from the remaining volume of the housing by the stator core support rings attached on both sides. As well as for the sealing-off or demarcation of the cavity by the stator core support rings, these can further be embodied for torque transmission. A dual function can thus be assigned to the stator core support rings. Firstly that of demarcation or sealing-off of the cavity and secondly that of torque transmission.

According to the invention the housing has at least one inlet bore between the first stator core support ring and the second stator core support ring, wherein the inlet bore fluidically couples the external area of the housing of the electrical machine and the cavity. Here, "fluidically coupled" means that the inlet bore is embodied as a through-channel for a fluid, and the fluid thus passes from an external area of the housing via the inlet bore into the cavity of the electrical machine. The fluid can for example be a liquid or a gaseous coolant. The inlet bore can preferably be arranged in the middle or centrally between the first and the second stator core support ring. Further, the inlet bore can be arranged centrally relative to the stator laminated core surface, that is between a first front face of the stator laminated core and an axially opposite second front face of the stator laminated core. Advantageously, multiple inlet bores distributed over the periphery of the housing in a circumferential direction of the housing can be provided at a predefined distance from each other. A simple arrangement of an electrical machine with integrated cavity results herefrom.

According to the invention, the stator laminated core has a cooling channel, which is fluidically coupled with the cavity via a channel entry. The channel entry is here arranged centrally in the middle of the stator laminated core, so that a T-shaped form of the cooling channel results in conjunction with the channel entry, by means of which a stream of coolant is not heated over the entire length of the stator laminated core, but only over the shorter stretch which is created by the T-shaped form. The coolant coming from the cavity can thereby be diverted through the cooling channel of the stator laminated core in an axial direction and guided axially through the cooling channel. The advantage thereby derives that the cooling channel lying within the stator laminated core can be fed with a coolant without great manufacturing effort.

The following method for cooling the electrical machine emerges through the arrangement of the above-described components of the electrical machine. According to the invention a coolant is conveyed radially through the at least one inlet bore of the housing from an external area of the housing into the cavity. By means of the cavity demarcated by the stator core support rings, that is to say the first stator core support ring and the second stator core support ring, which is partitioned off from the remaining housing volume, the coolant is backed up in the cavity. The coolant is then conveyed radially through the channel entry, which is arranged centrally in the middle of the stator laminated core, to the cooling channel of the stator laminated core of the electrical machine. The coolant is thereafter diverted through the cooling channel in an axial direction and conveyed axially starting from the center of the stator laminated core through the cooling channel, by means of which a stream of coolant is not heated over an entire length of the stator laminated core, but only over the shorter stretch which is created from the T-shaped form.

One embodiment of the invention provides that the external area is embodied as an inlet channel with a coolant inlet, wherein the inlet channel surrounds the housing externally in a radial manner. As the inlet bore fluidically couples the external area of the housing of the electrical machine and the cavity, the inlet channel is fluidically coupled with the cavity via the inlet bore. In other words, the inlet channel covers the inlet bore. By means of this embodiment, the coolant can be conveyed tangentially along the inlet channel of the electrical machine and then diverted radially through the at least one inlet bore. The advantage thereby results that a fluid conveyed through the inlet channel can be evenly distributed over the periphery of the housing in the inlet channel.

A further embodiment of the invention provides that a pressure plate which fixes the stator plate of the stator laminated core in place is arranged on the face of the stator laminated core. Here, the pressure plate can further have an exit bore, via which the cooling channel of the stator laminated core is fluidically coupled with the winding head space. In other words, the exit bore of the pressure plate can be embodied as a second through-channel, which, starting from the cooling channel, opens out into the winding head space of the electrical machine. By means of this arrangement, the coolant conveyed axially through the cooling channel can be conveyed to the exit bore of the pressure plate. The coolant can reach the winding head space of the electrical machine via the exit bore. By means of the direct throughflow of the coolant through the stator laminated core, the waste heat from the heat-generating components of the stator can be effectively dissipated and the stator can be particularly effectively cooled.

In a further embodiment a flow barrier can be arranged on the housing or on the winding overhang between the housing and the winding overhang of the stator laminated core, which projects into the winding head space of the electrical machine. "On the housing" here means an inner face or internal surface of the housing of the electrical machine. The flow barrier thus represents a sealing-off or demarcation for the coolant in the winding head space coming from the stator laminated core or cooling channel. The flow barrier can preferably be formed of plastic and/or metal. A glass fiber reinforced plastic (GRP for short) can in particular be used as the plastic. By means of the flow barriers the coolant can be forced to flow through the intermediate spaces of the winding overhang.

Advantageously, the electrical machine further comprises an outlet channel with a coolant outlet, wherein the outlet channel surrounds the housing in a radial manner. The outlet channel can for example be arranged externally on the housing on the axial end of the housing. The housing further has a drainage hole, which fluidically couples the winding head space and the outlet channel. In other words the drainage hole can be embodied as a third through-channel, which, starting from the winding head space, opens out into the outlet channel. The outlet channel can thus also cover the drainage hole. The outlet channel can further surround the housing of the electrical machine externally in a radial manner. Advantageously, multiple drainage holes distributed over the periphery of the housing in a circumferential direction of the housing can be provided at a predefined distance from each other. The drainage hole can further be arranged on an axial edge of the housing of the electrical machine.

The coolant passing through the exit bore of the pressure plate can now be conveyed by means of the flow barrier through the intermediate spaces of the winding overhang of the stator laminated core as far as the drainage hole of the housing. The coolant can then be conveyed tangentially along the outlet channel as far as a coolant outlet. The simple arrangement of the channels, that is the drainage hole, the outlet channel and the coolant outlet, gives rise to simple dissipation of the coolant from the electrical machine.

A liquid, in particular a transformer oil, or a gaseous fluid, in particular air, can be used as coolant.

An external pump unit can be provided so that the coolant can be conveyed through the electrical machine in a closed circuit. By means of the pump unit the coolant can be conveyed through the electrical machine to a heat exchanger, in which the absorbed waste heat of the electrical machine can be given off to an environment of the electrical machine or a working fluid.

The advantages and developments previously described in connection with the inventive electrical machine can be transferred to the inventive method.

BRIEF DESCRIPTION OF THE DRAWING

Exemplary embodiments of the invention are described below. It is shown in:

FIG. 3 a schematic representation of an embodiment of the cooling channel of the stator laminated core of the inventive electrical machine.

DETAILED DESCRIPTION OF PREFERRED EMBODIMENTS

The exemplary embodiments explained below take the form of preferred embodiments of the invention. However in the case of the exemplary embodiments, the described components of the embodiment respectively represent individual features considered independently of each other, which in each case also develop the invention in a mutually independent manner, and are thus also to be regarded individually or as an element of the invention as in the combination shown. Furthermore, the embodiments described can also be augmented by further features of the invention which have already been described.

Figure 1:
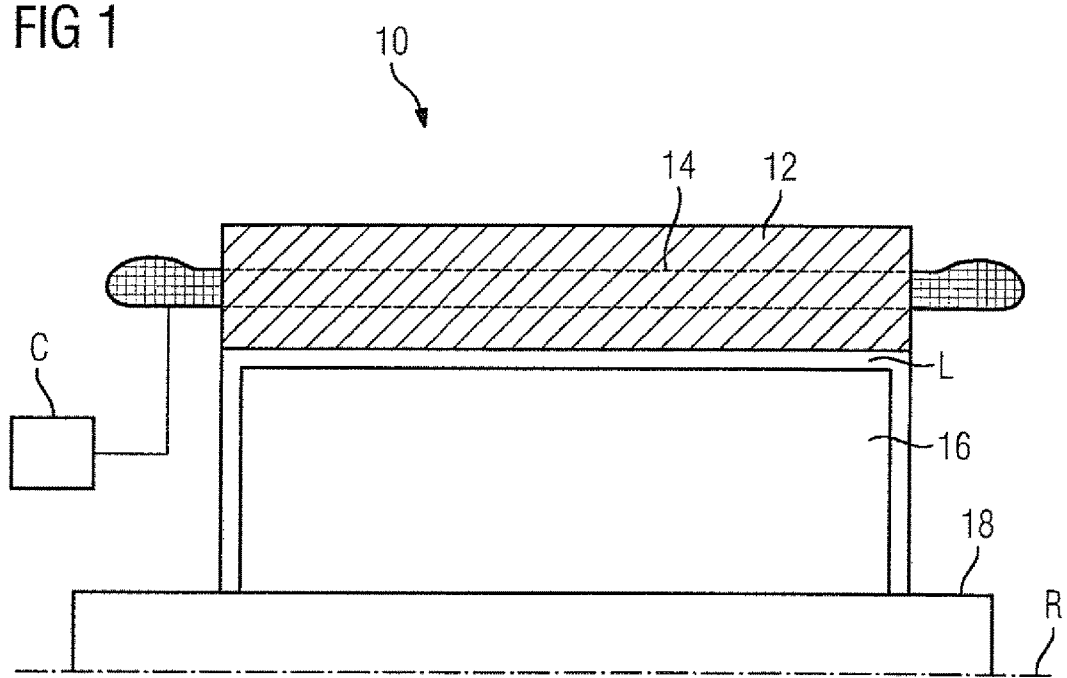
FIG. 1 a schematic representation of a cross-section of an embodiment of the inventive electrical machine.

FIG. 1 shows a general structure of an electrical machine 10. An electrical machine 10 is shown, which can take the form of the inventive electrical machine 10. The electrical machine 10 can be a permanent magnet synchronous machine or an electrical synchronous machine or a reluctance machine. In FIG. 1 an axis of rotation R also represents an axis of symmetry of the diagram. The electrical machine 10 comprises a stator 12, in which are arranged stator windings 14 of electrical coils, wherein only one of the stator windings 14 is shown in FIG. 1. The stator windings 14 are alternately energized by an AC source C, as a result of which within the interior of the stator 12 a rotating magnetic field occurs in an airgap L of the electrical machine 10. The AC source C can for example be a controlled inverter or a fixed frequency public electrical power supply network or a frequency converter. Inside the stator 12 is located a rotor 16, which is connected with a shaft 18 in a torque-proof manner. The shaft 18 is mounted in the stator 12 in a rotatable manner about axis of rotation R.

Figure 2:
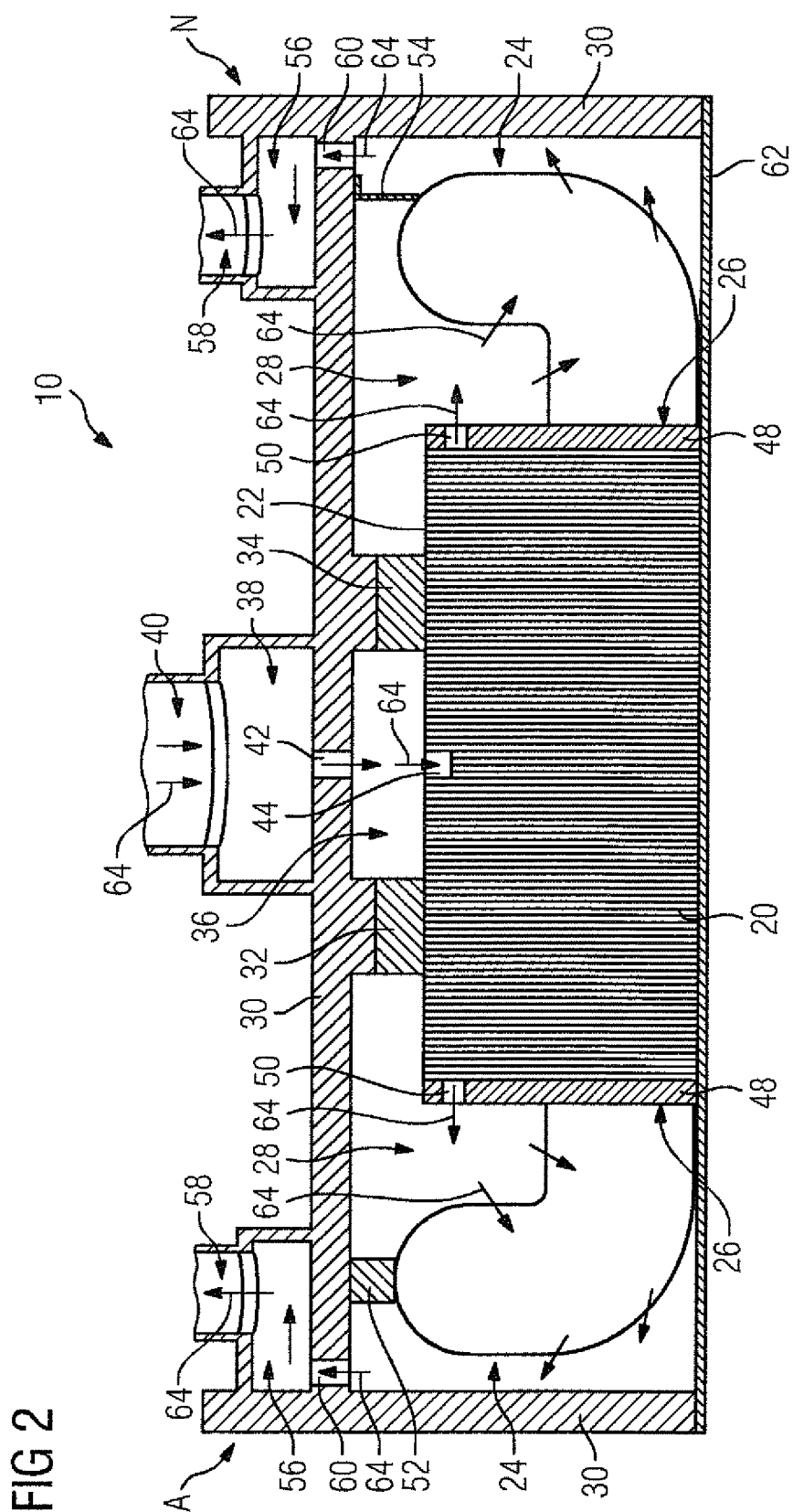
FIG. 2 a schematic cross-sectional representation of a further embodiment of the inventive electrical machine.

The electrical machine 10 is represented in greater detail in FIG. 2. The electrical machine 10 can for example take the form of a motor or generator. Among other components, the electrical machine 10 has a stator laminated core 20 with a stator laminated core surface 22. The stator laminated core 20 has a stator winding 14 in each case with a winding overhang 24 on one face 26 of the stator laminated core 20 on the drive side A, and a non-drive side N axially opposite the drive side A. Face 26 here refers to an axial edge or an axial lateral face of the stator laminated core 20, which extends perpendicularly to the main direction of extension of the electrical machine. The stator laminated core 20 has two front faces 26, that is to say a first lateral face and a second lateral face axially opposite to the first lateral face. The winding overhang 24 on the drive side A and the non-drive side N here projects into a respective winding head space 28. The stator laminated core 20 is fixed on the drive side A and the non-drive side N by a pressure plate 48 fixing the stator plates of the stator laminated core 20. The stator laminated core 20 can further have stator plates which fix each other in place, so that no pressure plates 48 are required on the respective front faces 26 of the stator laminated core 20. The stator laminated core 20 and the winding overhang 24 are further surrounded by a housing 30. A first stator core support ring 32 and a second stator core support ring 34 are arranged on the stator laminated core surface 22 between the housing 30 and stator laminated core 20 or the stator laminated core surface 22. The first 32 and the second stator core support ring 34 are here arranged axially at a prescribed distance from each other and radially surround the stator laminated core 20 on the stator laminated core surface 22. In other words the stator core support rings 32, 34 are embodied in annular form, and abut the stator laminated core surface 22. A cavity 36 is formed by the first 32 and the second stator core support ring 34 between the two stator core support rings 32, 34, the housing 30 and the stator laminated core surface 22. In other words the cavity 36 is separated from the remaining volume of the housing by the stator core support rings 32, 34 arranged on both sides on the stator laminated core surface 22.

As can be seen from FIG. 2, the housing 30 further has at least one inlet bore 42 between the first 32 and second stator core support ring 34. The inlet bore 42 here fluidically couples an external area of the housing 30 of the electrical machine 10 with the cavity 36. In other words the inlet bore 42 forms a first through-channel through the housing 30. The inlet bore 42 connects an external area of the housing of the electrical machine 10 with the cavity. According to FIG. 2 this external area is embodied as inlet channel 38. The inlet channel 38 surrounds the housing 30 externally in a radial manner. In other words the inlet channel 38 extends along the housing surface radially around the housing 30, here covering the inlet bore 42, which fluidically couples the inlet channel 38 with the cavity 36. In other words the inlet channel 38 is embodied as an annular distribution channel.

The inlet channel 38 further comprises a coolant inlet 40. The coolant inlet 40 is here embodied as a tube.

The stator laminated core 20 further has a channel, which is embodied in particular as a cooling channel (not shown in FIG. 2). The cooling channel is here fluidically coupled with the cavity 36 via a channel entry 44. The cavity 36 here so to speak forms a transitional area from the inlet bore 42 to the channel entry 44 or to the cooling channel respectively. Advantageously, multiple cooling channels can be provided in the stator laminated core 20.

FIG. 3 shows an embodiment of the cooling channel 46 with a cooling channel entry 44, as can also be used in FIG. 2. The cooling channel 46 thus runs axially to the drive side A and non-drive side N of the electrical machine 10, starting from the channel entry 44. In conjunction with the channel entry 44, the cooling channel 46 has a T-shaped form. The channel entry 44 is thus arranged centrally relative to the main direction of extension of the stator laminated core 20, that is to say in the middle of the stator laminated core 20. The cooling channel 46 can also take a different form. The cooling channel 46 can for example take a serpentine form. The cooling channel 46 passes into an exit bore 50 both on the drive side A and on the non-drive side N. This exit bore 50 is formed through a second through-channel by means of the pressure plates 48 fixing the stator plates of the stator laminated core 20 in place on drive side A and the non-drive side N. As already explained above, the stator laminated core 20 can also comprise mutually fixing stator plates, so that no pressure plates are required on the front faces 26. If the stator laminated core 20 has no pressure plates, the cooling channel 46 opens out directly into the winding head space 28. The stator laminated core 20 can further have multiple cooling channels with respective channel entries in each case.

The exit bore 50 opens out into the respective winding head space 28 on the drive side A and the non-drive side N. A first flow barrier 52 is arranged on the drive side A and a second flow barrier 54 on the non-drive side N, between the housing 30, that is the interior of the housing 30, and the winding overhang 24. Both flow barriers 52, 54 project into the winding head space 28. The flow barriers 52, 54 can be fixed to winding overhang 24 and/or to the interior of the housing 30. The first flow barrier 52 has, according to FIG. 2, a square cross section. The second flow barrier 54 on the other hand has a narrow, rectangular cross section. The second flow barrier 54 can further have an angled cross section. One arm of the angle, that is to say the second flow barrier 54, is here attached to the inside of the housing 30 and the second arm of the angle projects into the winding head space 28 and reaches as far as winding overhang 24 or as far as a surface of the winding overhang 24. The first 52 and the second flow barrier 54 can be identically embodied, that is to say the first 52 and the second flow barrier 54 can be of square cross section or angled form. Other geometrical forms of cross section can also be conceivable. The first 52 and the second flow barrier 54 can in each case, as can be seen from FIG. 2, also take a different form. The first 52 and the second flow barrier 54 can extend over the width of the winding overhang 24. In other words the flow barriers 52, 54 can extend between the winding overhang 24 and the housing 30 in the circumferential direction of the housing 30.

A drainage hole 60 is provided on the drive side A and the non-drive side N of the electrical machine 10 respectively. The drainage hole 60 penetrates the housing 30 and fluidically couples the respective winding head space 28 on the drive side A and the non-drive side N with an outlet channel

56. The outlet channel 56 too surrounds the housing 30 externally in a radial manner, as is already the case with the inlet channel 38. The outlet channel 56 thus covers the respective drainage hole 60. The outlet channel 56 further has a coolant outlet 58, which can be embodied as a tube. Underneath the stator laminated core 20 the electrical machine 10 further comprises a canned tube 62, which is connected with the housing 30 and thus includes the stator laminated core 20 with the winding overhang 24. The canned tube 62 forms a boundary between the stator 12 and the rotor 16, which is built into an airgap between the rotor 16 and the stator 12. By means of the canned tube 62, the volume of the housing in which the stator 12 is located is hermetically separated from the volume of the housing in which the rotor 16 is located.

Through the corresponding structure or arrangement of the machine components, a method for cooling the electrical machine 10 can be implemented, which will be addressed in greater detail below. Here, the flow arrows 64 are to indicate the course of flow of the coolant through the electrical machine 10. Starting from the coolant inlet 40, through which the coolant is initially directed radially into the inlet channel 38, the coolant is diverted through the inlet channel 38 and conveyed tangentially along the inlet channel 38. The coolant radial is distributed radially around the housing surface, that is over the periphery of the housing by means of the inlet channel 38.

The coolant is then conveyed radially through the at least one inlet bore 42. With the flow of coolant through the inlet bore 42, the coolant passes from the inlet channel 38 into cavity 36, which is separated from the remaining volume of the housing. The coolant backs up in the cavity 36 and is then conveyed radially via channel entry 44 into the cooling channel 46 in the stator laminated core 20. By means of the cooling channel 46, the coolant is diverted in an axial direction and directed axially through the cooling channel 46 as far as an exit bore 50 on the drive side A and the non-drive side N of the electrical machine 10. The stream of coolant directed through the channel entry 44 into the cooling channel 46 is thus divided, wherein one part of the stream of coolant is directed to the non-drive side N and the other part of the stream of coolant to a drive side A of the electrical machine 10. Depending on the form taken by the cooling channel, the coolant is directed for example axially or in a serpentine manner through the stator laminated core 20 from the channel entry 44 as far as drive side A and non-drive side N. If the stator laminated core 20 has no pressure plates 48 on its front faces 26, the coolant is channeled directly into the winding head space 28. The coolant directed through the stator laminated core 20 absorbs the waste heat present, for example copper losses or iron losses of the electrical machine 10. Through the division of the stream of coolant, not only is a stream of coolant directed, for example, from the non-drive side N to the drive side A of the electrical machine 10, but starting from a center of the stator laminated core 20 is also directed from the drive side A and the non-drive side N. Significantly more heat can thereby be dissipated, as the stream of coolant does not heat up over the entire length of the stator laminated core 20. The stream of coolant on the non-drive side N would here be markedly warmer than on the drive side A, and in the course of its flow from the non-drive side N to the drive side A could absorb an ever-decreasing amount of waste heat. By means of a shorter stretch, which is created by the T-shaped form of the cooling channel 46 with the channel entry 44, the coolant can absorb more waste heat.

The coolant thereafter leaves the stator laminated core 20 or the cooling channel 46 via the respective exit bore 50 of the pressure plate 48 to the winding head spaces 28 or winding overhangs 24 of the drive side A, and the non-drive side N. By means of the flow barriers 52, 54 attached to the housing 30 or winding overhang 24, the coolant is forced to flow through the intermediate spaces of the winding overhang 24. After the coolant has absorbed waste heat from the winding overhang 24, the coolant leaves the respective winding head space 28 by bilaterally drilled, radially arranged drainage holes 60 in the housing 30. The coolant is then conveyed tangentially along the outlet channel 56 to the coolant outlet 58.

Overall, a cooling concept involving stators subject to a throughflow of fluid, with canned tube sealing, thus emerges. The stator housing is sealed off by means of a tube known as a canned tube, in the stator assembly bore. The encapsulated stator housing is currently cooled by means of static oil filling or by means of vacuum indexed oil circulation. According to the new cooling concept, the coolant flows through radially arranged bores centrally into the stator housing. This entry area is separated from the remaining volume of the housing by the stator core support rings arranged on both sides. The coolant is thus conveyed to the stator assembly through likewise radially arranged access apertures. The coolant now directed through the stator laminated core absorbs the waste heat present (copper losses, iron losses). The coolant thereafter leaves the stator laminated core via the pressure plates for the winding heads of the drive side, and of the non-drive side. By means of barriers, so-called flow barriers, attached to the housing, the coolant is forced to flow through the intermediate spaces of the winding heads. After absorbing the waste heat from the winding heads, the coolant leaves the winding head spaces via bilaterally drilled, radially arranged holes in the housing. In the case of stator laminated cores of structurally large electrical machines, the ratio of electrically and electromagnetically active material, that is to say the material which generates waste heat, to the stator laminated core surface, is very high. For this reason it is difficult to dissipate the waste heat effectively from the surface of the assemblies. With the cooling concept, cooling channels lying within the stator laminated core can be fed with the coolant without great manufacturing effort. In these channels, located within the interior of the assemblies, the medium can effectively absorb the waste heat. It then flows at both ends of the stator laminated core from the stator laminated core through the winding heads and absorbs the waste heat from the winding heads. With this cooling concept it is possible to cool all heat-generating components of the stator effectively by means of direct throughflow or overflow.

Electrical machines of this kind are used in mills, in particular in vertical mills. The fields of application here include the crushing of limestone, slag, clinker, chalk, gypsum and ores in the construction materials industry, as well as coal during coal processing.

What is claimed is:
1. An electrical machine, comprising:
   a stator laminated core having a stator laminated core surface and including a stator winding with a winding overhang which is sized to project into a winding head space on a face of the stator laminated core;
   a housing surrounding the stator laminated core and the winding overhang; and
   first and second stator core support rings arranged on the stator laminated core surface between the housing and the stator laminated core and axially spaced from each other at a predefined distance, said first and second stator core support rings radially surrounding the stator laminated core, with a cavity being formed between the housing, the stator laminated core surface and the first and second stator core support rings, said housing having an inlet bore arranged between the first and second stator core support rings and adapted to fluidically couple an external area of the housing and the cavity, wherein the stator laminated core has a cooling channel which is fluidically coupled with the cavity via a channel entry arranged centrally in the middle of the stator laminated core, thereby creating a T-shaped form of the cooling channel in conjunction with the channel entry so that a stream of coolant is not heated over an entire length of the stator laminated core, but only over a shorter stretch as a result of the T-shaped form.

2. The electrical machine of claim 1, wherein the external area is embodied as an inlet channel with a coolant inlet, said inlet channel surrounding the housing externally in a radial manner.

3. The electrical machine of claim 1, further comprising a pressure plate arranged on the face of the stator laminated core and adapted to fix stator plates of the stator laminated core in place, said pressure plate having an exit bore to fluidically couple the cooling channel of the stator laminated core with the winding head space.

4. The electrical machine of claim 1, further comprising a flow barrier arranged between the housing and the winding overhang on the housing or on the winding overhang, said flow barrier projecting into the winding head space.

5. The electrical machine of claim 4, wherein the flow barrier is formed of plastic.

6. The electrical machine of claim 1, further comprising an outlet channel radially surrounding the housing and having a coolant outlet, said housing having a drainage hole fluidically coupling the winding head space and the outlet channel.

7. A method for cooling an electrical machine having a housing, comprising:
radially conveying coolant through an inlet bore of the housing of the electric machine;
backing-up the coolant in a cavity bounded by first and second stator core support rings arranged between the housing and a stator laminated core of the electric machine;
radially conveying the coolant through a channel entry, arranged centrally in the middle of the stator laminated core, to a T-shaped cooling channel of the stator laminated core;
diverting the coolant through the cooling channel in an axial direction; and
axially conveying the coolant starting from the middle of the stator laminated core through the cooling channel so that a stream of coolant does not heat up over an entire length of the stator laminated core, but only over a shorter stretch as a result of the T-shaped form of the cooling channel.

8. The method of claim 7, further comprising arranging a pressure plate on a face of the stator laminated core to fix stator plates of the stator laminated core in place, wherein the coolant is conveyed in the axial direction through the cooling channel to an exit bore of the pressure plate.

9. The method of claim 7, further comprising arranging a flow barrier between the housing and a winding overhang of a stator winding of the stator laminated core on the housing or on the winding overhang, wherein the coolant is conveyed by the flow barrier through the winding overhang to a drainage hole of the housing and tangentially along an outlet channel, arranged in radial surrounding relationship to the housing, to a coolant outlet of the outlet channel.

10. A vertical mill, comprising an electrical machine, said electric machine comprising a stator laminated core having a stator laminated core surface and including a stator winding with a winding overhang which is sized to project into a winding head space on a face of the stator laminated core, a housing surrounding the stator laminated core and the winding overhang, and first and second stator core support rings arranged on the stator laminated core surface between the housing and the stator laminated core and axially spaced from each other at a predefined distance, said first and second stator core support rings radially surrounding the stator laminated core, with a cavity being formed between the housing, the stator laminated core surface and the first and second stator core support rings, said housing having an inlet bore arranged between the first and second stator core support rings and adapted to fluidically couple an external area of the housing and the cavity, wherein the stator laminated core has a cooling channel which is fluidically coupled with the cavity via a channel entry arranged centrally in the middle of the stator laminated core, thereby creating a T-shaped form of the cooling channel in conjunction with the channel entry so that a stream of coolant is not heated over an entire length of the stator laminated core, but only over a shorter stretch as a result of the T-shaped form.

11. The vertical mill of claim 10, wherein the external area is embodied as an inlet channel with a coolant inlet, said inlet channel surrounding the housing externally in a radial manner.

12. The vertical mill of 10, wherein the electrical machine has a pressure plate arranged on the face of the stator laminated core and adapted to fix stator plates of the stator laminated core in place, said pressure plate having an exit bore to fluidically couple the cooling channel of the stator laminated core with the winding head space.

13. The vertical mill of claim 10, wherein the electrical machine arranged between the housing and the winding overhang on the housing or on the winding overhang, said flow barrier projecting into the winding head space.

14. The vertical mill of claim 13, wherein the flow barrier is formed of plastic.

15. The vertical mill of claim 10, wherein the electrical machine has an outlet channel radially surrounding the housing and having a coolant outlet, said housing having a drainage hole fluidically coupling the winding head space and the outlet channel.

* * * * *